(12) United States Patent
Czebiniak et al.

(10) Patent No.: US 8,972,804 B2
(45) Date of Patent: Mar. 3, 2015

(54) POINT OF NEED ACCESS TO AN ELECTRONIC MAINTENANCE MANUAL UTILIZING CURRENT MACHINE STATUS

(75) Inventors: Nicholas W. Czebiniak, Williamson, NY (US); Charles P. Vorndran, Rochester, NY (US); John R. Russell, Rochester, NY (US); Cheryl M. Koenig, Ontario, NY (US); Suraj Kumar, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 715 days.

(21) Appl. No.: 12/883,960

(22) Filed: Sep. 16, 2010

(65) Prior Publication Data

US 2012/0072814 A1 Mar. 22, 2012

(51) Int. Cl.
G06F 11/36 (2006.01)
G06F 17/22 (2006.01)
G06F 11/26 (2006.01)

(52) U.S. Cl.
CPC ............ G06F 17/2229 (2013.01); G06F 11/26 (2013.01)
USPC ................................. 714/57; 714/25; 714/26

(58) Field of Classification Search
USPC .............. 714/26, 57, 25; 705/7.12, 7.16, 7.21
See application file for complete search history.

(56) References Cited

U.S. PATENT DOCUMENTS

| | | | |
|---|---|---|---|
| 4,810,958 A | 3/1989 | Mogi et al. | 324/73 R |
| 5,202,726 A | 4/1993 | McCulley et al. | 355/206 |
| 5,940,846 A | 8/1999 | Akiyama | 707/539 |
| 6,377,956 B1 | 4/2002 | Hsu et al. | 707/104.1 |
| 6,400,462 B1 * | 6/2002 | Hille | 358/1.14 |
| 6,718,490 B1 * | 4/2004 | Takemoto et al. | 714/47.1 |
| 6,883,139 B2 | 4/2005 | Takeoka | 715/530 |
| 6,959,235 B1 * | 10/2005 | Abdel-Malek et al. | 701/29.4 |
| 7,739,007 B2 * | 6/2010 | Logsdon | 701/31.5 |
| 2002/0007237 A1 * | 1/2002 | Phung et al. | 701/33 |
| 2002/0059269 A1 * | 5/2002 | McQuown et al. | 707/100 |
| 2005/0055239 A1 * | 3/2005 | Farmer | 705/1 |
| 2006/0085108 A1 * | 4/2006 | Grier et al. | 701/29 |
| 2006/0168475 A1 * | 7/2006 | Segers et al. | 714/25 |
| 2007/0213855 A1 * | 9/2007 | Furuno et al. | 700/83 |
| 2008/0103843 A1 * | 5/2008 | Goeppert et al. | 705/7 |
| 2009/0006476 A1 * | 1/2009 | Andreasen et al. | 707/104.1 |
| 2009/0055045 A1 * | 2/2009 | Biswas et al. | 701/33 |
| 2009/0256693 A1 * | 10/2009 | Brinton et al. | 340/439 |
| 2013/0018803 A1 * | 1/2013 | Challu | 705/304 |

OTHER PUBLICATIONS

Wikipedia's Primary Flight Display version from May 3, 2010 http://en.wikipedia.org/w/index.php?title=Primary_flight_display&oldid=359855169.*

* cited by examiner

*Primary Examiner* — Joseph Schell
(74) *Attorney, Agent, or Firm* — Kermit D. Lopez; Luis M. Ortiz; Ortiz & Lopez, PLLC

(57) ABSTRACT

A method and system for providing point of need diagnostic information in an electronic service manual. A rendering device can be configured to transmit machine diagnostics related reports to a computer. The diagnostics are then integrated into an electronic service manual. In this way a reference can be created which includes point of need diagnostic information related to the machine, thereby increasing the productivity of user time spent on maintenance activities associated with the machine.

18 Claims, 4 Drawing Sheets

POINT OF NEED ACCESS TO AN ELECTRONIC MAINTENANCE MANUAL UTILIZING CURRENT MACHINE STATUS

TECHNICAL FIELD

Embodiments are generally related to data-processing systems and rendering devices, such as printers, photo-copy machines, scanners, fax machines and the like. Embodiments also relate to the servicing of rendering devices or reproduction machines. Embodiments additionally relate to method and systems for point of need access to diagnostic information provided in electronic maintenance manuals.

BACKGROUND OF THE INVENTION

As reproduction machines and rendering devices such as copiers and printers become more complex and versatile in the jobs they can perform, servicing such devices also becomes more complex. These rendering devices include numerous subcomponents, each of which contributes to some operation of the rendering device.

Due to the complexity of rendering devices, numerous tasks are often required of service representatives as devices malfunction, are diagnosed, and corrected. Troubleshooting can involve numerous servicing procedures to isolate malfunctioning device subcomponents. Service representatives must, therefore, keep track of servicing procedures previously performed in order to isolate the source of any device malfunction.

In accordance with the types of operations preferably performed by a particular rendering device, the initial set-up of the machine varies. Accordingly, identical rendering devices can initially be provided with widely varying set-up features. This can make it difficult for a service technician to know specifically what service procedure to follow for a given device.

Periodic maintenance is required for all production and many office printing systems. Such systems typically define a set of High Frequency Service Items ("HFSI"), which outline various maintenance activities that must be performed at different intervals. These systems also employ internal sensors and counters to determine which of the HFSI's require servicing at a particular time. The status of these HFSIs is presented, on request, to the operator. In past embodiments, the operator would navigate to a machine diagnostics window to view a table of HFSI items, manually record any items that needed attention, and then navigate away from the HFSI table to the appropriate parts list and repair procedure. The navigational steps between the HFSI and appropriate procedures decrease the service provider's efficiency.

Such systems may also provide information relating to errors that have occurred since the system was last serviced. This information is useful in determining what services and repairs are necessary to fix the system.

For any problem that requires attention, there is typically an online maintenance manual ("Edoc") that details the specific procedure for servicing the problem. When performing maintenance on the system, the operator typically views the machine diagnostics to determine the problem that requires attention, looks up the appropriate maintenance procedure, performs the specified maintenance procedure, and repeats the above steps for the next problem. The time spent on periodic maintenance is non-productive overhead. The present invention reduces the non-productive time spent on identifying and troubleshooting problems.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide an improved method for servicing a reproduction machine or rendering device.

It is another aspect of the present invention to provide a method for generating a customized maintenance manual utilizing the rendering device's diagnostics.

The aforementioned aspects and other objectives and advantages can now be achieved as described herein. A method and system is disclosed for providing point of need access to machine diagnostics within an electronic service manual. In general, a machine (e.g., a rendering device) can be connected to a computer. Thereafter, the machine provides the machine's diagnostics evaluation to the computer. The machine diagnostics are then integrated into the electronic service manual wherein the service manual includes identification of particular activities necessary for servicing the machine, thereby resulting in point of need access to information necessary to service the machine and a related reduction of non-productive user time spent on maintenance activities associated with the machine.

The machine diagnostics may include information regarding machine configuration via a tag associated with the machine, a list of items requiring service associated with the machine, or a table of faults since last service. Thus, the user is provided this information in the electronic service manual as necessary to service the machine. The electronic service manual may further include hyperlinks in the table of faults since last service to the appropriate repair procedure for each of the faults. The tag status may be included in the electronic service module where needed in a troubleshooting procedure. The HFSI may be presented as a table including service item name, a parts list, a repair analysis procedure, a due interval, a count of said service items, and a serial number of needed service items. The HFSI may further indicate items that require immediate user attention in red and items that will require replacement or repair soon in yellow.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments described herein can be implemented in the context of a host operating system and one or more modules. Such modules may constitute hardware modules, such as, for example, electronic components of a computer system. Such modules may also constitute software modules. In the computer programming arts, a software "module" can be typically implemented as a collection of routines and data structures that performs particular tasks or implements a particular abstract data type.

Software modules generally include instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and recordable media. An example of such a module is module 104 depicted in FIG. 1.

It is important to note that, although the embodiments are described in the context of a fully functional data-processing apparatus (e.g., a computer system), those skilled in the art will appreciate that the mechanisms of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

Figure 1:
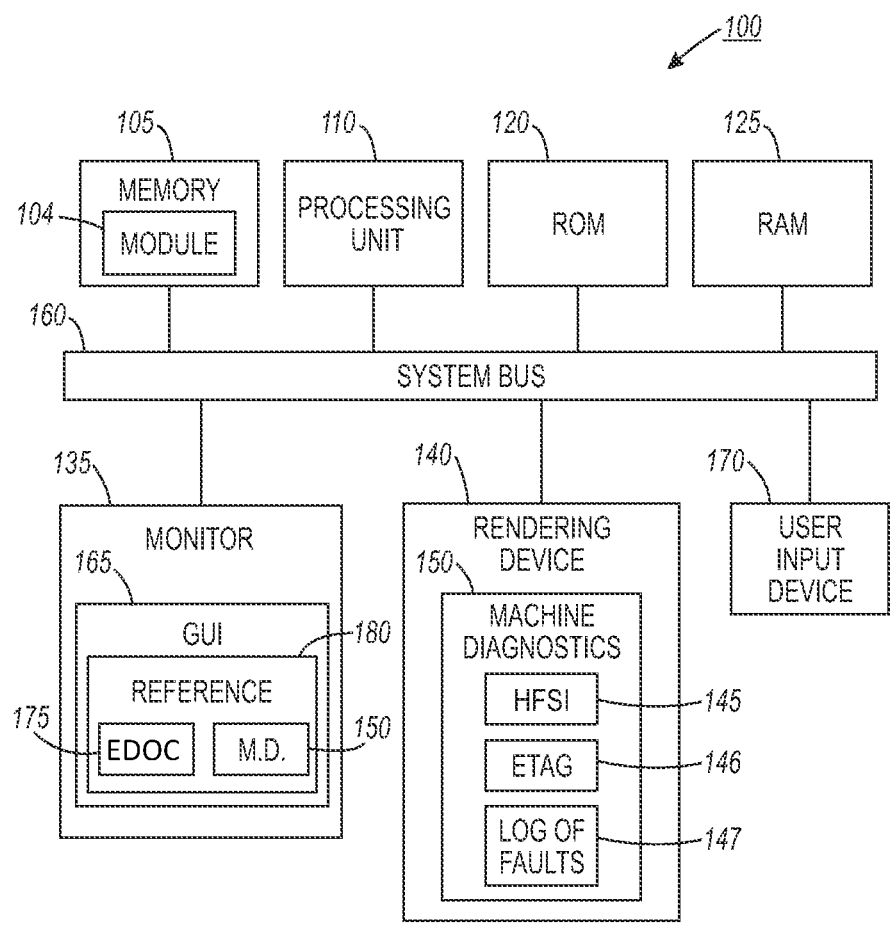
FIG. 1 illustrates a block diagram of a data-processing system, which can be utilized for providing point of need access to an electronic service manual, in accordance with a preferred embodiment.

Referring to the drawings and in particular to FIG. 1, there is depicted a data processing apparatus 100 for providing point of need access to diagnostic information in an electronic service manual (e.g., a computer and a rendering device) in accordance with a preferred embodiment. As shown in FIG. 1, a memory 105, a processor (CPU) 110, a Read-Only memory (ROM) 120, and a Random-Access Memory (RAM) 125 are generally connected to a system bus 160 of data-processing apparatus 100. Memory 105 can be implemented as a ROM, RAM, a combination thereof, or simply a general memory unit. Module 104 can be stored within memory 105 and then retrieved and processed via processor 110 to perform a particular task. A user input device 170, such as a keyboard, mouse, or another pointing device, is also connected to and communicates with system bus 160.

Depending upon the design of data-processing apparatus 100, memory 105 may be utilized in place of or in addition to ROM 120 and/or RAM 125. A monitor 135 can also be connected to system bus 160 and can communicate with memory 105, processor 110, ROM 120, RAM 125 and other system components. Monitor 135 generally functions as a display for displaying data and information for a user and for interactively displaying a graphical user interface (GUI) 165. A rendering device or reproduction machine 140 is also connected to system bus 160 and can generate a machine diagnostics 150 which includes High Frequency Service Items 145, a tag status module 146, and a log of faults 147 as shown. The rendering device 140 can be implemented as a rendering device, such as, for example, a laser jet printer, a photocopy machine, a fax machine, a scanner, and so forth, depending upon design considerations.

Note that the term "GUI" generally refers to a type of environment that represents programs, files, options and so forth by means of graphically displayed icons, menus, and dialog boxes on a computer monitor screen. A user can interact with the GUI to select and activate such options by pointing and clicking with a user input device 170 such as, for example, a pointing device such as a mouse, and/or with a keyboard. A particular item can function in the same manner to the user in all applications because the GUI provides standard software routines (e.g., module 104) to handle these elements and reports the user's actions. The GUI can further be used to display the electronic service manual 175 as shown.

In a preferred embodiment, machine diagnostics 150, including High Frequency Service Items 145, tag status module 146, and log of faults 147, are integrated into electronic service manual 175. The result is a reference 180 which can be displayed on monitor 135 using GUI 165. In this embodiment, the user is presented with a comprehensive reference 180 that provides point of need diagnostic information about rendering device 140 within electronic service manual 175 so that a user does not spend valuable time navigating between the rendering device's 140 diagnostic report and a service manual giving instruction on how to fix the problem.

Figure 2:
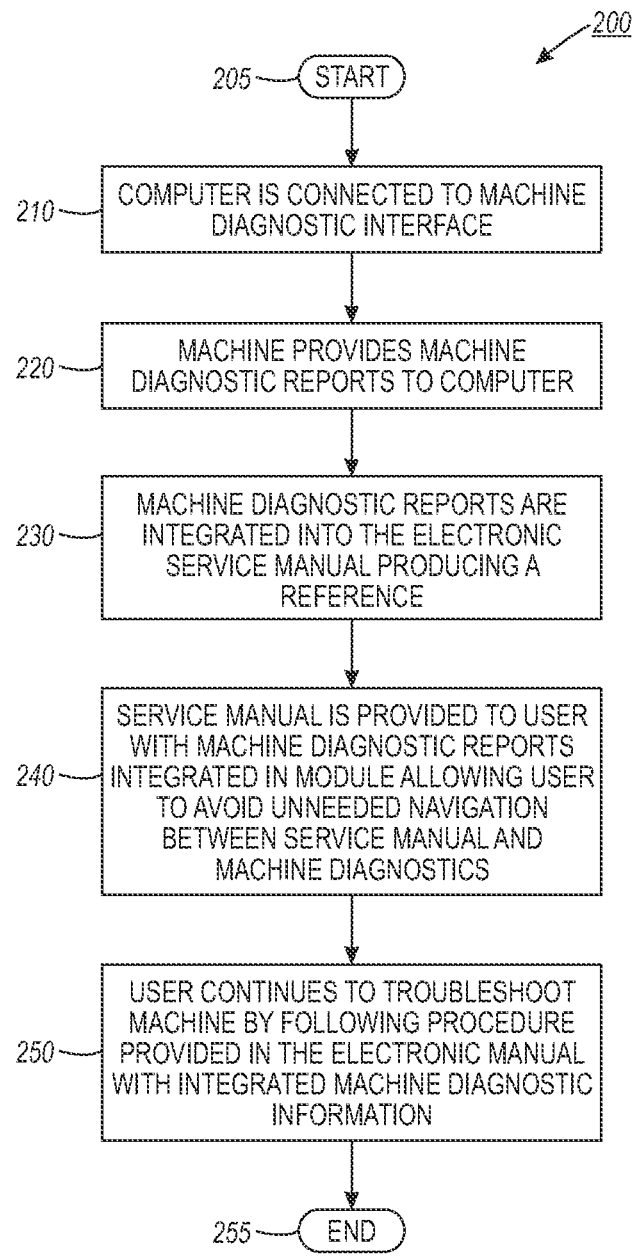
FIG. 2 illustrates a high level flowchart of operations depicting logical operational steps for providing point of need access to an electronic service manual, in accordance with a preferred embodiment.

Referring to FIG. 2, a high level flowchart 200 is illustrated, which describes integrating and providing machine diagnostics with an electronic service manual thereby providing point of need access to diagnostic information in said service manual, in accordance with a preferred embodiment. Note that the process or method described in flow chart 200 of FIG. 2 can be implemented in the context of a software module, such as module 104 of data-processing apparatus 100 depicted in FIG. 1. A process can begin as indicated at block 205. As described at block 210, the computer is first connected to the machine via a machine diagnostic interface. One skilled in the art would appreciate that the connection between the computer and machine can be made using any known connection method including wireless data transmission methods. A rendering device, such as the rendering device 140 depicted in FIG. 1, can provide the computer a complete list of service related items as indicated at block 220 in a diagnostic report. In a preferred embodiment, the diagnostic report provided by the machine includes a list of faults since last service, a tag status module which includes information associated with the machine configuration, and information relating to the machine's HFSI.

As described next at block 230, the machine diagnostics are then integrated into the electronic service module. The machine diagnostics are preferably organized in the service manual so that the information therein is readily provided and accessible without additional navigation away from the service manual. For example, diagnostic information relating to the machine's tag status would be integrated into the electronic service manual so that when a user encounters a step in the troubleshooting procedure, provided in the electronic service manual, requiring a check of the machine tag status, the tag status would be provided instantly in the electronic service manual at that step.

After the machine diagnostics are integrated into the electronic service manual at block 230, the manual is made available to the service operator as shown at block 240. The user may then continue troubleshooting the machine according to the procedure provided by the electronic service manual with the integrated machine diagnostics as indicated at block 250. The process can then end, as indicated at block 255.

Figure 3:
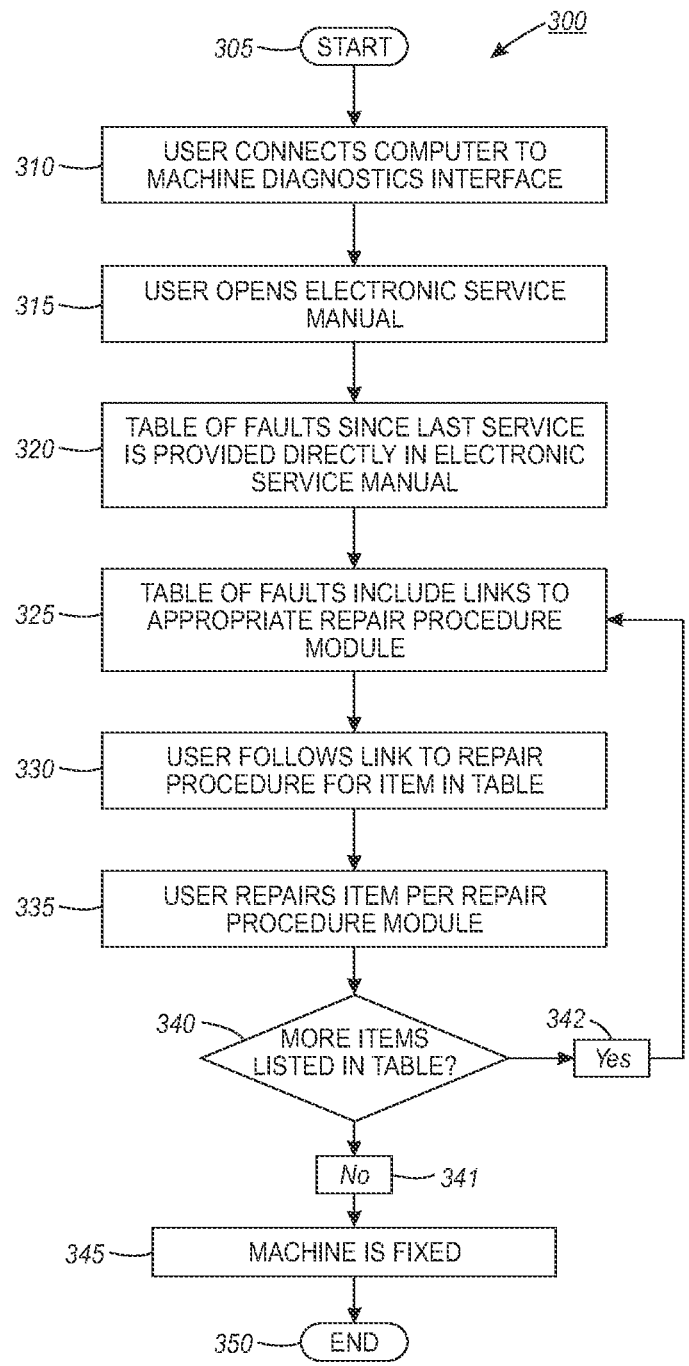
FIG. 3 illustrates a high level flowchart of operations depicting logical operational steps for the use of a faults since last service table in accordance with a preferred embodiment.

Referring to FIG. 3, a high level flowchart of operations depicting logical operational steps for the use of a table faults since last service is illustrated, in accordance with a preferred embodiment. Note that Edoc window 175 of FIG. 1 can be implemented utilizing a GUI such as the GUI 165 depicted in FIG. 1 and can be provided by a module, such as, for example, module 104. Edoc window 175 can be displayed via a display device such as monitor 135 depicted in FIG. 1. By clicking with a pointing device such as a mouse, the user can navigate material in the electronic service manual and table of faults as described herein.

As shown in FIG. 3, a user connects a computer to a machine diagnostics interface as shown at block 310. The table of faults since last service is included in the machine diagnostics. A user then opens an electronic service manual on a computer as shown at block 315. In the prior art, the electronic service manual would be provided completely independently of the machine diagnostics. Thus, upon opening the machine diagnostics and electronic service manual, a service technician would navigate to a log of faults and manually record the status and fault information displayed in the diagnostics window. The service technician would then navigate back to the electronic service manual to determine the appropriate procedure.

In the present embodiment, a table of faults since last service is provided directly in the electronic service manual as shown at block 320. As shown at block 325 the table of faults includes links to an appropriate repair procedure module for each of the faults listed. The user follows the link in the table to the proper repair procedure as shown at block 330, and repairs the listed item as shown at block 335. The service technician then determines if there are more items in the list of faults table that need to be addressed as shown at block 340. If there are more items listed in the table of faults, as indicated by block 342, the method returns to block 325 and is repeated for the remaining faults listed. If there are no more items listed in the table of faults, as indicated by block 341, all the items listed in the table have been fixed, and the machine is fixed as shown at block 345. The method is then completed as shown at block 350. In this way, the service technician is able to save valuable time in servicing a rendering device 140 of FIG. 1 because it is no longer necessary to navigate between the diagnostic information from the machine and the electronic service manual.

Figure 4:
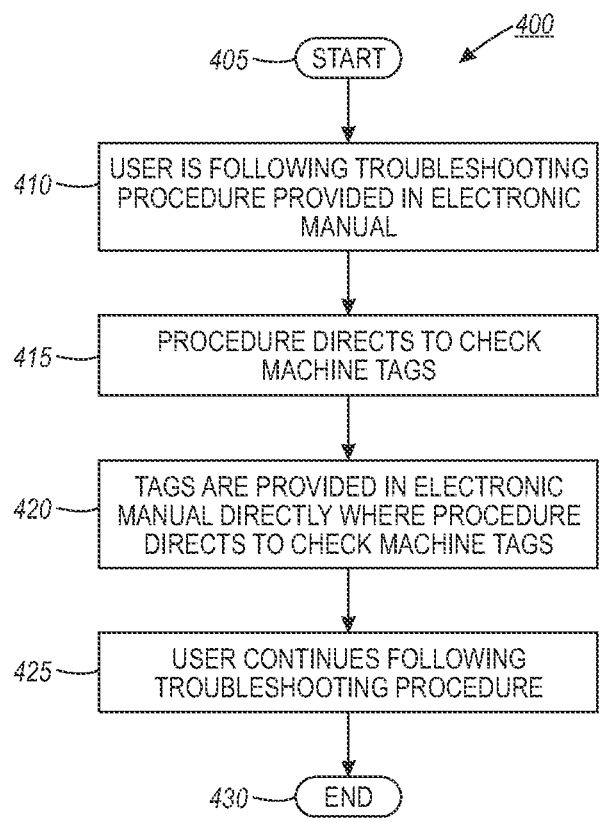
FIG. 4 illustrates a high level flowchart of operations depicting logical operational steps for the use of Etags in a troubleshooting procedure in accordance with a preferred embodiment.

Referring to FIG. 4, a high level flowchart of operations depicting logical operational steps for the use of a tag status module is illustrated, in accordance with a preferred embodiment. The method can start as indicated at block 405. Next, a service technician follows those steps described in FIG. 2 and/or FIG. 3, so that said user is in the process of following a troubleshooting procedure provided in an electronic service manual as indicated by block 410. In the course of troubleshooting the machine, the user is prompted to check the machine tag status module shown in block 415.

One skilled in the art will appreciate that such a tag status module may be an Electronic Tag ("ETag"). ETags are used to tell a service technician the specific status of a given service item associated with a rendering device. For example, in the course of repairing a rendering device, a service technician may need to know if a specific fuser heat lamp wire has been installed in the machine. An Etag provides this information to the user. However, in the prior art a service technician was required to toggle to the diagnostics associated with the machine and manually record ETag values. The user would then return to the repair procedure.

However, after a service technician is directed to check a machine tag (block 415), at block 420 the tag status module is integrated in the electronic service manual directly where the repair procedure calls for an ETag status check. The user then continues with the troubleshooting procedure as indicated at block 425 and the method ends at block 430. Following this method allows a user to avoid extra time and effort in toggling between machine diagnostics and the electronic service manual and manually recording ETag status.

The primary focus of such embodiments is the reduction of non-productive time spent on daily maintenance activities. This can be accomplished by providing an operator with a customized electronic service manual with those activities that must be performed, along with detailed instructions for performing each activity. Time is therefore saved because the operator does not need to continuously navigate between the diagnostic report from the machine and the electronic service manual. Time is also saved by optimizing the sequence of operations to be performed based on the specific procedures required in each maintenance session. The overall quality of the maintenance performed may also be improved, by providing the operator with easy access to the detailed maintenance procedures, reducing the chance that they will attempt to perform the procedures "from memory" rather than taking the time to search out a frequently-performed procedure in the manual. Improving the quality of daily maintenance procedures can reduce subsequent system downtime for reliability or image quality problems, and potentially avoid unscheduled service calls.

A primary advantage involves maximizing the overall available productive time of a machine, resulting in more billable clicks. This represents one advantage to the provider of the machine. An advantage to the end user or customer is a higher net productivity, which provides a greater return on their printing and rendering assets. Additional advantages may include reduced service calls due to better overall machine maintenance. The contribution of reduced daily maintenance time to overall system productivity is also another advantage.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for providing point of need diagnostic information in an electronic service manual, comprising:
transmitting machine diagnostics data related to a rendering machine comprising a printer, from said rendering machine to a computer via at least one machine diagnostic interface;
incorporating said machine diagnostics data into an electronic service manual for said rendering machine, wherein said electronic service manual is stored on said computer;

creating a customized electronic service manual comprising said machine diagnostics data organized in said electronic service manual such that said machine diagnostics data is integrated into a repair procedure provided in said electronic service manual thereby resulting in said customized electronic service manual including point of need diagnostic information related to said rendering machine, thereby increasing the productivity of user time spent on maintenance activities associated with said rendering machine;

organizing said machine diagnostics data as a table of faults since last service;

incorporating said table of faults since last service in said customized electronic service manual such that said table of faults since last service includes said repair procedure provided in said electronic service manual; and providing a link to a repair procedure module for each of said faults in said table of faults.

2. The method of claim 1 further comprising:
integrating a tag status module comprising an Etag with said customized electronic service manual, wherein said tag status module is located in said customized electronic service manual at a point in a troubleshooting procedure where an Etag status is required.

3. The method of claim 1 further comprising:
integrating a table of items requiring service with said customized electronic service manual.

4. The method of claim 3 further comprising:
configuring said table of items requiring service to include at least one service item name, at least one parts list, at least one repair procedure module, at least one due interval for said service item, at least one current count of said service items, and at least one serial number of said service item.

5. The method of claim 4 further comprising:
configuring said table of items requiring service to indicate service items that need attention in red and to indicate service items that will require replacement soon in yellow.

6. The method of claim 1 further comprising:
configuring said machine diagnostics data to include at least one of a table of faults since last service, a tag status module associated with said rendering machine, and a list of service items associated with said rendering machine.

7. A system for providing point of need diagnostic information in an electronic service manual, comprising:
a computer comprising a processor configured for executing non-transitory instruction media;
a rendering machine comprising a printer configured to transmit machine diagnostics data related to said rendering machine, from said rendering machine to said computer via at least one machine diagnostic interface;
an electronic service manual associated with said rendering machine and stored on said computer;
a customized electronic service manual comprising said machine diagnostics data organized in said electronic service manual such that said machine diagnostics data is integrated into a repair procedure provided in said electronic service manual thereby resulting in said customized electronic service manual including point of need diagnostic information related to said rendering machine, thereby increasing the productivity of user time spent on maintenance activities associated with said rendering machine;

a table of faults since last service provided in said customized maintenance manual, comprising said machine diagnostics organized in a table of faults since last service; and a repair procedure module, comprising incorporating said table of faults since last service in said customized maintenance manual such that said table of faults since last service includes said repair procedure provided in said electronic maintenance manual, wherein said table of faults includes a link to said repair procedure module for each of said faults.

8. The system of claim 7 further comprising:
a tag status module comprising an Etag integrated with said customized electronic service manual, wherein said tag status module is located in said customized electronic service manual at a point in a troubleshooting procedure where said tag status is required.

9. The system of claim 7 further comprising:
a table of items requiring service integrated with said customized electronic service manual.

10. The system of claim 9 wherein said table of items requiring service is configured to include at least one service item name, at least one parts list, at least one repair procedure module, at least one due interval for said service item, at least one current count of said service items, and at least one serial number of said service item.

11. The system of claim 10 wherein said table of items requiring service is configured to indicate any service item that needs attention in red and to indicate any service items that will require replacement soon in yellow.

12. The system of claim 7 wherein said machine diagnostics data are configured to include at least one of a table of faults since last service, a tag status module associated with said rendering machine, and a list of service items associated with said rendering machine.

13. A method for providing point of need diagnostic information in an electronic service manual, comprising:
transmitting machine diagnostics data related to a rendering machine comprising a printer, from said rendering machine, to a computer via at least one machine diagnostic interface;
incorporating said machine diagnostics data into an electronic service manual for said rendering machine, wherein said electronic service manual stored on said computer;
creating a customized electronic service manual comprising said machine diagnostics data organized in said electronic service manual such that said machine diagnostics data is integrated into a repair procedure provided in said electronic service manual;
incorporating a table of faults since last service in said customized electronic service manual such that said table of faults since last service includes said repair procedure provided in said electronic service manual;
integrating a tag status module with said customized electronic service manual; and
integrating a table of items requiring service with said customized electronic service manual, resulting in said customized electronic service manual including point of need diagnostic information related to said rendering machine, thereby increasing the productivity of user time spent on maintenance activities associated with said rendering machine.

14. The method of claim 13 further comprising:
integrating an appropriate repair procedure module with said customized electronic service manual.

15. The method of claim 14 wherein said table of faults since last service includes a link to said repair procedure module for each of said faults.

16. The method of claim 13 wherein said tag status module comprises an Etag.

17. The method of claim 13 wherein said table of items requiring service comprises a table of High Frequency Service Items comprising a service item name, a parts list, a repair analysis procedure, a due interval, a count of service items, and a serial number of needed service items.

18. The method of claim 13 further comprising:
   presenting said customized electronic service manual using a graphical user interface.

* * * * *